United States Patent [19]

Harvey et al.

[11] 4,358,884
[45] Nov. 16, 1982

[54] TIN-BASE BODY SOLDER

[75] Inventors: Douglas J. Harvey, Sterling Heights; Neal E. O'Connor, Troy; Joseph J. Bronson, Utica, all of Mich.

[73] Assignee: General Motors Corporation, Detroit, Mich.

[21] Appl. No.: 199,027

[22] Filed: Oct. 20, 1980

[51] Int. Cl.³ .............................................. B05D 7/14
[52] U.S. Cl. .................. 29/402.18; 29/527.3; 29/527.4; 29/530; 427/142; 428/648; 420/557
[58] Field of Search ............... 427/142, 11; 29/402.18, 29/530, 527.3, 527.4, 527.5; 75/175 R; 428/648

[56] References Cited

U.S. PATENT DOCUMENTS

| | | | |
|---|---|---|---|
| 1,437,641 | 12/1921 | Ferriere et al. | 75/175 R |
| 1,567,396 | 12/1925 | Schwalm | 75/175 R |
| 2,457,599 | 12/1948 | Pessel | 29/530 |
| 2,473,386 | 6/1949 | Hull | 75/134 |
| 2,733,168 | 1/1956 | Hodge et al. | 75/175 R X |
| 3,362,063 | 1/1968 | Williams | 29/530 |
| 4,248,905 | 2/1981 | Harvey | 427/11 |

FOREIGN PATENT DOCUMENTS 491173  8/1938  United Kingdom ............. 29/402.18

*Primary Examiner*—Kenneth J. Ramsey
*Attorney, Agent, or Firm*—Douglas D. Fekete

[57] ABSTRACT

In a preferred embodiment, a method is presented for filling depressions in fabricated steel surfaces by applying a metallic body solder consisting of 14 to 20 weight percent copper, 1 to 7.5 weight percent zinc, 0.5 to 1.5 weight percent iron and the balance tin. The body solder alloy is heated to form workable thixotropic paste that is applied with spreading onto the steel surface. Upon cooling, the body solder forms a dense, tightly adherent fill that is grindable and paintable in conjunction with the surrounding steel surface.

10 Claims, No Drawings

TIN-BASE BODY SOLDER

BACKGROUND OF THE INVENTION

This invention relates to a lead-free metallic body solder and, more particularly, to a tin-base body solder containing copper, iron and preferably zinc.

Body solder is traditionally a lead-base alloy that is applied to a fabricated steel surface to fill depressions about a welded seam or to repair a dent, and thereby form a smooth decorative surface. Lead-base alloys form a spreadable, workable paste over a wide range of moderately elevated temperatures, and, upon cooling, form a dense, tightly adherent fill suitable for surface finishing and painting in conjunction with the surrounding steel surface. However, lead requires careful handling in a plant environment.

U.S. Patent application Ser. No. 113,559, filed Jan. 21, 1980, now U.S. Pat. No. 4,248,905, and assigned to the assignee of the present invention, describes a lead-free tin-base body solder comparable to conventional lead-base solders. The body solder consists of 10 to 25 weight percent copper, 1 to 7.5 weight percent zinc and the balance tin, and forms a spreadable paste when heated above about 210° C. For convenient handling, the alloy is cast and extruded into a bar. It has been found that the formation of the desired paste is particularly sensitive to rapid cooling of the casting, preferably at a rate between 10° to 100° C. per second, so as to form a relatively fine dendritic microstructure. When reheated, the rapidly cooled casting produces fine particles suspended in liquid phase to form the desired paste. However, it is difficult to achieve the desired rapid cooling in large-scale production.

Therefore, it is an object of this invention to provide a lead-free body solder composed of a tin-base alloy that is readily castable and forms when reheated a spreadable paste whose properties are relatively insensitive to the casting cooling rate. The predominantly tin alloy contains copper, iron and preferably zinc. The paste displays properties comparable to lead-base alloys or rapidly cooled iron-free tin-base alloys and is suitable for filling a depression in a fabricated steel surface.

SUMMARY OF THE INVENTION

In a preferred embodiment, depressions in a fabricated steel surface are filled with a body solder consisting of 14 to 20 weight percent copper (Cu), 1 to 7.5 weight percent zinc (Zn), 0.5 to 1.5 weight percent iron (Fe) and the balance tin (Sn) and containing no lead (Pb). For convenient handling, the alloy is manufactured by casting a homogeneous melt, cooling and thereafter extruding into a bar. While handling the bar at one end, the other end is heated to form a thixotropic paste, which occurs above about 210° C. The paste exhibits a consistency similar to molding clay or plaster and is readily spread onto the steel surface. Upon cooling, the body solder forms a dense, void-free fill, that tightly bonds to the steel. The fill is suitable for grinding and feathering to form a smooth surface with the surrounding steel, and thereafter for painting.

A significant feature of the family of body solder alloys of this invention is that they are readily cast to form a solid that is adapted for remelting to form a desired paste. The paste comprises fine solid particles suspended in a liquid. The fine particles are lubricated by the liquid and flow in response to hand applied force. In contrast, large particles produce a lumpy paste that tears when spread, requires excessive spreading force and bleeds, despite the same solid-liquid proportions. Furthermore, the paste having the desired consistency forms at a temperature suitable for steel application. The cooled alloy tightly bonds to the steel and is finishable in conjunction with the surrounding steel surface. Thus, the lead-free body solder alloys of this invention are readily substitutable for conventional lead-base body solders and are more readily manufactured than iron-free tin-copper-zinc alloys.

DETAILED DESCRIPTION OF THE INVENTION

A preferred tin-base body solder alloy consists of 15 weight percent copper, 2.5 weight percent zinc, 1.0 weight percent iron and the balance tin. The alloy is prepared with a copper-base master alloy comprising about 10 weight percent iron. Nine parts by weight commutator copper and one part electrolytic iron are melted in an induction furnace at 2800° F., while covered with a charcoal blanket. The melt is stirred inductively for about 10 minutes and cast into a water-cooled steel mold.

The master alloy is added to molten tin, heated in a clay-graphite crucible to about 550° C., well above the tin melting point. The tin melt is covered with a zinc chloride flux to aid copper dissolution. Additional copper metal is dissolved in the melt to adjust the alloy copper content. The flux is then skimmed from the melt and the required amount of metallic zinc was simply dissolved therein. The homogeneous tin-copper-zinc-iron melt is cast into a water-cooled copper mold comprising a cylindrical cavity having a 25 mm diameter and a 100 mm length. After cooling to room temperature, the cylindrical casting is extruded into a bar that is about 6 mm in diameter and about 400 mm in length.

For testing, a dented steel sheet surface is cleaned and fluxed with a commercially obtained acid zinc chloride material comprising, by weight, about 32% zinc chloride, about 8.9 to 9.9% ammonium chloride, about 4.15 to 4.65% hydrochloric acid, water and thickening agents in an amount to produce a clear, colorless gel. A powder composed of a substantially similar tin-base alloy is preferably added to the flux for concurrently tinning the steel surface. The slurry is brushed generously onto the clean surface and heated with a direct flame to melt the alloy powder and wet the steel. Excess is wiped off with a cloth.

While holding one end of the body solder bar in one hand, the free end is heated using an open natural gas flame. Paste formation is evidenced by noticeable softening of the alloy, including bending of the bar. The paste is spread onto the prepared surface using an oiled maple paddle. Upon cooling, the alloy forms a tightly bonded crack-free fill. The fill surface is finished by grinding, whereupon the fill is blended into the surrounding steel surface by feathering, that is, by grinding progressively thinner near the boundary. The smooth surface is then painted. The paint coat may be baked at a temperature as high as about 200° C. without sagging of the fill.

While not limited to any particular theory, a similar tin-copper-zinc alloy containing no iron comprises a classic dendritic microstructure. Although the connection is not clear, this microstructure tends to produce a hard casting that is difficult to extrude and to form a paste that is difficult to spread. Rapid cooling of the casting reduces the dendrite size and improves these properties. In accordance with this invention, it has now been found that a small iron addition substantially inhibits dendrite formation so that a fine second phase forms. The size and shape of this phase is relatively independent of the casting cooling rate and results in a spreadable paste. Also, the casting is softer and more readily extruded. It is estimated that an alloy containing 0.5% iron and cooled at a rate of about 15° C. per second has paste-forming properties comparable to an iron-free alloy cooled at 150° C. per second, a tenfold increase.

As little as 0.25 weight percent iron significantly inhibits dendrite formation and allows relatively slow cooling after casting. Iron contents greater than about 1.5 weight percent produce a coarse iron-rich phase that is not desired. Iron contents between about 0.75 to 1.25 weight percent are preferred.

Tin-copper-zinc-iron body solder alloys of this invention exhibit other desirable properties. These properties are attributed principally to the combination of tin, copper and zinc and are not adversely affected by the iron. The alloys form spreadable, thixotropic pastes when heated above about 210° C., but do not sag or flow at typical paint curing temperatures up to about 200° C. The paste is preferably applied at about 270° C. or lower to avoid heat damage to the steel, although the paste may be spreadable at higher temperatures also. Since the paste is workable down to about 210° C., ample time is provided after the heat source is removed to apply and spread the paste. The paste readily sticks to the steel, but not to a wooden applicator. It is suitably plastic to spread without hot shorting, but retains its shape without bleeding or flowing. The alloy cools to form a tightly bonded, dense fill. The fill is grindable with excellent feathering and paintable without special pretreatment. Therefore, the alloys of this invention are suitable for replacing lead-base body solders.

In general, it has been found that alloys containing less than about 10 weight percent copper, form excessive liquid upon heating, which results in bleeding and on-panel running. Greater than about 25 weight percent copper forms pastes that are unacceptably brittle and tend to hot short. The copper content is preferably 14 to 20 weight percent and more preferably 14 to 16 weight percent. Suitable body solders are formed of copper-tin alloys containing iron but essentially no zinc. However, between about 1.0 to 7.5 weight percent zinc is desired to broaden the spreadable temperature range without causing hot shorting. About 2 to 3 weight percent zinc is preferred.

In the preferred embodiment, the body solder is cast and extruded into a convenient bar. Although the iron reduces the sensitivity of the casting to cooling, cooling rates greater than about 1° C. per second are preferred. It is found that extrusion or other mechanical working substantially enhances the remelt paste-forming properties of the cast alloy. Extrusion is preferably carried out at a temperature less than about 150° C. and so as to reduce the cross-sectional area by at least 4:1. The bar may be alternately formed by rolling. Body solder alloys of this invention are not limited to a particular shape or manner of application, but are readily adapted to be applied by other techniques, including from a mush pot.

Although this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A method for filling a depression in a fabricated metal surface by applying to said surface a workable thixotropic paste formed by heating an alloy comprising about 10 to 25 weight percent copper, 0.25 to 1.5 weight percent iron, zero to 7.5 weight percent zinc and the balance tin.

2. A method for filling a depression in a fabricated steel surface by applying to said surface a workable thixotropic paste formed by heating to a temperature above about 210° C. an alloy comprising about 14 to 20 weight percent copper, 0.5 to 1.5 weight percent iron, about 1 to 7.5 weight percent zinc and the balance tin.

3. A method for filling a depression in a fabricated steel surface, said method comprising
casting a tin-base alloy consisting essentially of about 14 to 20 weight percent copper, about 1 to 7.5 weight percent zinc, and 0.5 to 1.5 weight percent iron, and the balance tin, the casting having a shape adapted for extrusion,
extruding said casting to form a bar,
heating the bar to a temperature of about 210° C. or higher to form a spreadable thixotropic paste, and
applying with spreading the paste to the steel surface to fill said depression and provide a surface that is grindable and paintable in conjunction with the surrounding steel surface.

4. A method of filling a depression in a fabricated steel surface, said method comprising
casting a tin-base alloy consisting essentially of about 14 to 16 weight percent copper, about 2 to 3 weight percent zinc, 0.75 to 1.25 weight percent iron and the balance tin, the casting having a shape adapted for extrusion,
extruding said casting at a temperature less than about 150° C. to form a bar, said alloy being worked during extrusion to an extent equivalent to reducing a cross-sectional area by at least 4:1,
heating the bar to a temperature of about 210° C. or higher to form a spreadable thixotropic paste, and
applying with spreading the paste to the steel surface to fill said depression, said application occurring at a temperature less than about 270° C. to minimize heat damage to the surface, said paste providing a surface that is grindable and paintable in conjunction with the surrounding steel surface.

5. A method of manufacturing a tin-base alloy suitable for use in filling a depression in a fabricated steel surface, said tin-base alloy comprising about 10 to 25 weight percent copper, zero to 7.5 weight percent zinc, 0.25 to 1.5 weight percent iron and the balance tin, said method comprising
casting a homogeneous melt of the alloy, and
working said casting at a temperature less than about 150° C. to form a bar, said alloy being worked to an extent equivalent to reducing a cross-sectional area by at least 4:1.

6. A metallic body solder comprising, by weight, between about 10 to 25 percent copper, zero to 1.7 percent zinc, 0.25 to 1.5 percent iron and the balance tin, said body solder forming when suitably heated a workable thixotropic paste that is spreadable to fill a depression in a steel body surface and upon cooling form a dense paintable surface adherent to said steel body.

7. A metallic body solder comprising, by weight, between about 14 to 20 percent copper, about 2 to 3 percent zinc, 0.75 to 1.25 percent iron and the balance tin, said body solder forming a spreadable paste when suitably heated above about 210° C., which paste is spreadable to fill a depression in a steel body surface and upon cooling form a dense, paintable surface adherent to said steel body.

8. A method for manufacturing a tin-base alloy suitable for use as body solder in filling a depression in a fabricated steel surface, said method comprising casting a homogeneous alloy melt consisting essentially of about 14 to 20 weight percent copper, about 1 to 7.5 weight percent zinc, about 0.5 to 1.5 weight percent iron and the balance tin, said casting producing a solid alloy suitable for extrusion, and extruding the cast alloy, said extrusion suitably working the cast alloy to produce an extruded alloy adapted to form upon heating a workable, thixotropic paste suitable for body solder use.

9. A metallic body solder incorporated onto a steel surface to fill a depression therein and formed of an alloy comprising, by weight, between about 10 to 25 percent copper, zero to 7.5 percent zinc, 0.25 to 1.5 percent iron and the balance tin, said body solder forming a dense fill that adheres to said steel body.

10. A metallic body solder incorporated onto a steel surface to fill a depression therein and formed of an alloy consistent essentially of, by weight, between about 14 to 16 percent copper, 2 to 3 percent zinc, 0.75 to 1.25 percent iron and the balance tin, said body solder forming a dense fill adherent to said steel body and having a surface suitable for finishing and painting in conjunction with surrounding steel surface.

* * * * *

UNITED STATES PATENT AND TRADEMARK OFFICE
CERTIFICATE OF CORRECTION

PATENT NO. : 4,358,884
DATED : November 16, 1982
INVENTOR(S) : D. J. Harvey, N. E. O'Connor, J. J. Bronson It is certified that error appears in the above—identified patent and that said Letters Patent is hereby corrected as shown below:

In the references, "2,473,386" should read -- 2,473,886 --.

Column 2, line 54, "theprepared" should read -- the prepared --.

Column 4, line 64, "1.7" should read -- 7.5 --.

Signed and Sealed this

Fifteenth Day of March 1983

[SEAL]

Attest:

GERALD J. MOSSINGHOFF

Attesting Officer     Commissioner of Patents and Trademarks